US009503841B2

(12) United States Patent
Knaappila

(10) Patent No.: US 9,503,841 B2
(45) Date of Patent: Nov. 22, 2016

(54) METHOD AND TECHNICAL EQUIPMENT FOR SHORT RANGE DATA TRANSMISSION

(71) Applicant: Silicon Laboratories Finland Oy, Espoo (FI)

(72) Inventor: Jere Knaappila, Evitskog (FI)

(73) Assignee: Silicon Laboratories Finland OY, Espoo (FI)

( * ) Notice: Subject to any disclaimer, the term of this patent is extended or adjusted under 35 U.S.C. 154(b) by 0 days.

(21) Appl. No.: 14/660,218

(22) Filed: Mar. 17, 2015

(65) Prior Publication Data

US 2015/0271628 A1 Sep. 24, 2015

(30) Foreign Application Priority Data

Mar. 18, 2014 (FI) ...................................... 20145250

(51) Int. Cl.
*H04B 7/00* (2006.01)
*H04W 4/00* (2009.01)
*H04W 76/04* (2009.01)
*H04W 76/02* (2009.01)
*H04W 24/10* (2009.01)
*H04B 17/00* (2015.01)

(52) U.S. Cl.
CPC ............. *H04W 4/008* (2013.01); *H04W 24/10* (2013.01); *H04W 76/023* (2013.01); *H04W 76/043* (2013.01)

(58) Field of Classification Search
CPC ... H04B 1/109; H04B 1/1027; H04B 17/318
USPC .............. 455/41.2–41.3, 226.1–226.2, 250.1
See application file for complete search history.

(56) References Cited

U.S. PATENT DOCUMENTS

| 8,457,261 | B1 | 6/2013 | Shi et al. |
| 9,118,294 | B2* | 8/2015 | Mochizuki ........ H04W 52/0245 |
| 2009/0109885 | A1 | 4/2009 | Fonseca, Jr. et al. |
| 2010/0009632 | A1 | 1/2010 | Ibrahim et al. |
| 2010/0109864 | A1 | 5/2010 | Haartsen et al. |
| 2011/0189956 | A1* | 8/2011 | Gandolfo ............... H04B 1/406 |
| | | | 455/41.2 |
| 2012/0266251 | A1 | 10/2012 | Birtwhistle et al. |
| 2012/0294398 | A1 | 11/2012 | Yucek et al. |
| 2012/0319774 | A1 | 12/2012 | Ibrahim et al. |
| 2014/0073262 | A1 | 3/2014 | Gutierrez et al. |

FOREIGN PATENT DOCUMENTS

| GB | 2505324 A | 2/2014 |
| JP | 2004336630 | 11/2004 |
| WO | WO2013/184283 A1 | 6/2013 |
| WO | WO2013/181778 A1 | 12/2013 |

OTHER PUBLICATIONS

Search Report, FI20145250, Oct. 15, 2014, 2 pgs.
Search Report, EP15397509, Jun. 16, 2015, 2 pgs.

* cited by examiner

*Primary Examiner* — Lee Nguyen
(74) *Attorney, Agent, or Firm* — Egan Peterman Enders Huston

(57) ABSTRACT

The application relates to a method, an apparatus and a computer program product. The method comprises adjusting dynamically a sensitivity of a receiver from a default sensitivity to a low sensitivity; wherein the adjusting is based on the signal strength of at least one existing connection or at least one previous connection; receiving only such packets by the receiver which are available with the low sensitivity.

21 Claims, 9 Drawing Sheets

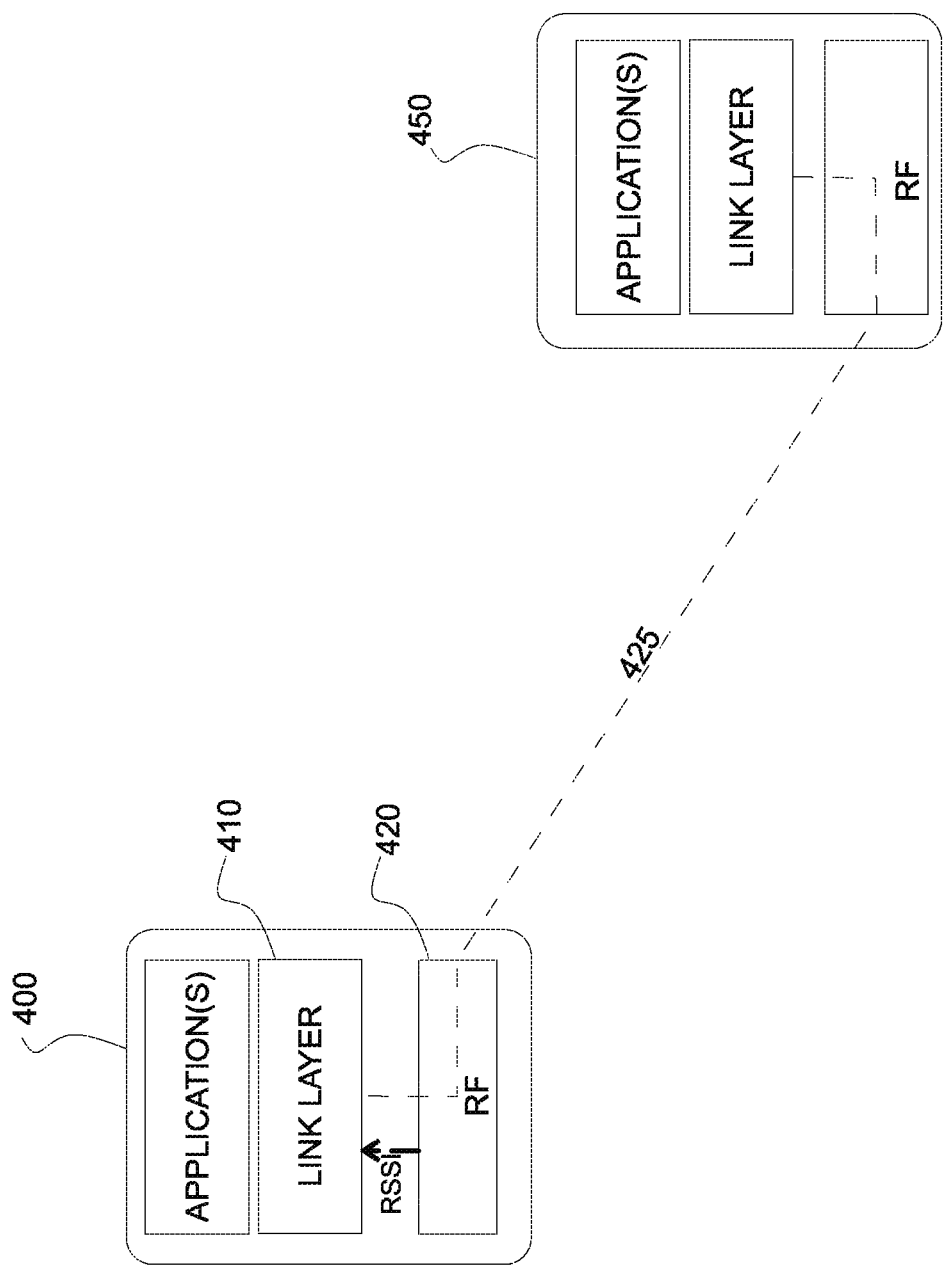

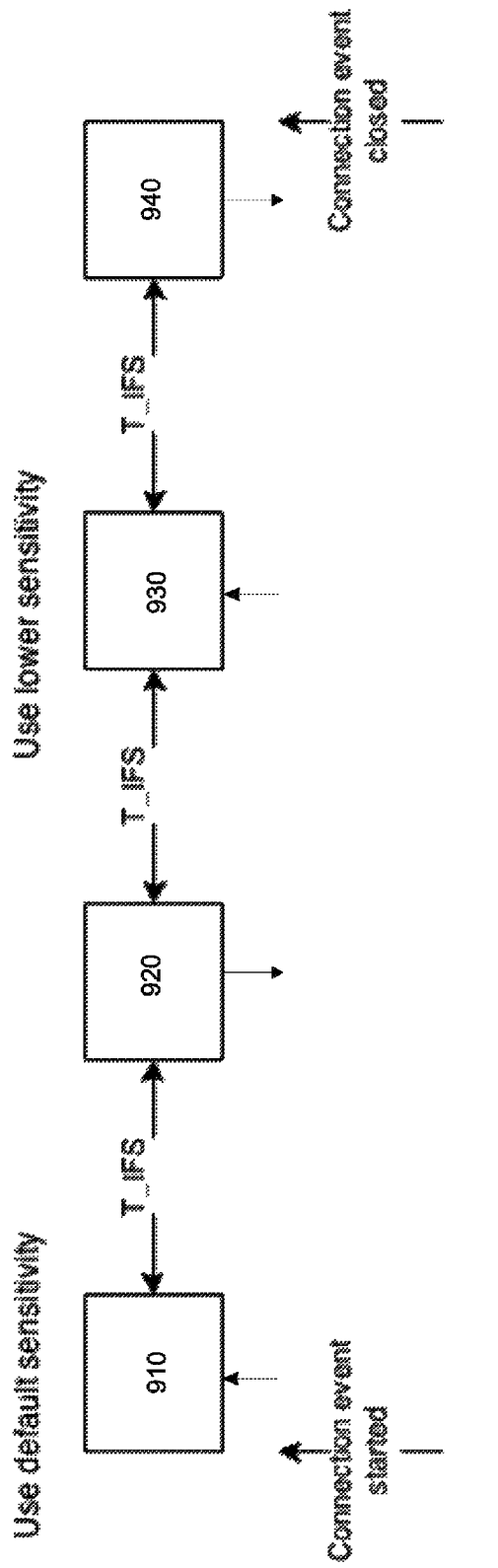

METHOD AND TECHNICAL EQUIPMENT FOR SHORT RANGE DATA TRANSMISSION

This application claims priority to co-pending Finnish patent application serial number 20145250 filed on Mar. 18, 2014, the disclosure of which is incorporated herein by reference in its entirety for all purposes.

TECHNICAL FIELD

The present application relates to Bluetooth modules. In particular the present application relates to Bluetooth low energy.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new applications utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

SUMMARY

Now there has been invented an improved method and technical equipment implementing the method, by which sensitivity of a radio can be adjusted, whereby also a high accuracy distances measurement in both far and short distances can be implemented at the same time using normal low energy radios. Various aspects of the invention include a method, an apparatus, comprising a computer program stored therein, which are characterized by what is stated in the independent claims. Various embodiments of the invention are disclosed in the dependent claims.

According to a first aspect, there is provided a method comprising adjusting dynamically a sensitivity of a receiver from a default sensitivity to a low sensitivity; wherein the adjusting is based on the signal strength of at least one existing connection or at least one previous connection; and receiving only such packets by the receiver which are available with the low sensitivity.

According to a second aspect, there is provided an apparatus comprising at least processing means and memory means, wherein the apparatus is configured to adjust dynamically a sensitivity from a default sensitivity to a low sensitivity; wherein the adjusting is based on the signal strength of at least one existing connection or at least one previous connection; and receiving only such packets which are available with the low sensitivity.

According to a third aspect, there is provided a computer program product embodied on a computer readable medium comprising computer program code configured to, when executed on at least one processor, cause an apparatus or a system adjust dynamically a sensitivity from a default sensitivity to a low sensitivity; wherein the adjusting is based on the signal strength of at least one existing connection or at least one previous connection; and receiving only such packets which are available with the low sensitivity.

According to an embodiment, the adjusting of the sensitivity based on the signal strength of at least one existing connection comprises receiving first packet from a sender with default sensitivity by the receiver; determining if a saturation occurs in the receiver due to the received packet, and if so, decreasing the sensitivity from the default sensitivity to the low sensitivity, and receiving at least one second packet with the low sensitivity, and going to step of determining the saturation; otherwise determining signal strength of the received packet; and reporting the signal strength.

According to an embodiment, a distance between the receiver and the sender is determined by means for the determined signal strength.

According to an embodiment, the receiver is a Bluetooth low energy enabled device.

DESCRIPTION OF THE DRAWINGS

In the following, various embodiments of the invention will be described in more detail with reference to the appended drawings, in which

FIG. 4 shows an arrangement according to an embodiment;

FIG. 9 shows an example of slave device's operation during connection event.

DESCRIPTION OF EXAMPLE EMBODIMENTS

In the following, several embodiments of the invention will be described in the context of adjusting a sensitivity of a device in order to determine a received signal strength indication for purposes of distance determination. It is to be noted, however, that the invention is not limited to this. In fact, the different embodiments have applications in any environment where device's sensitivity is to be adjusted.

Figure 1:
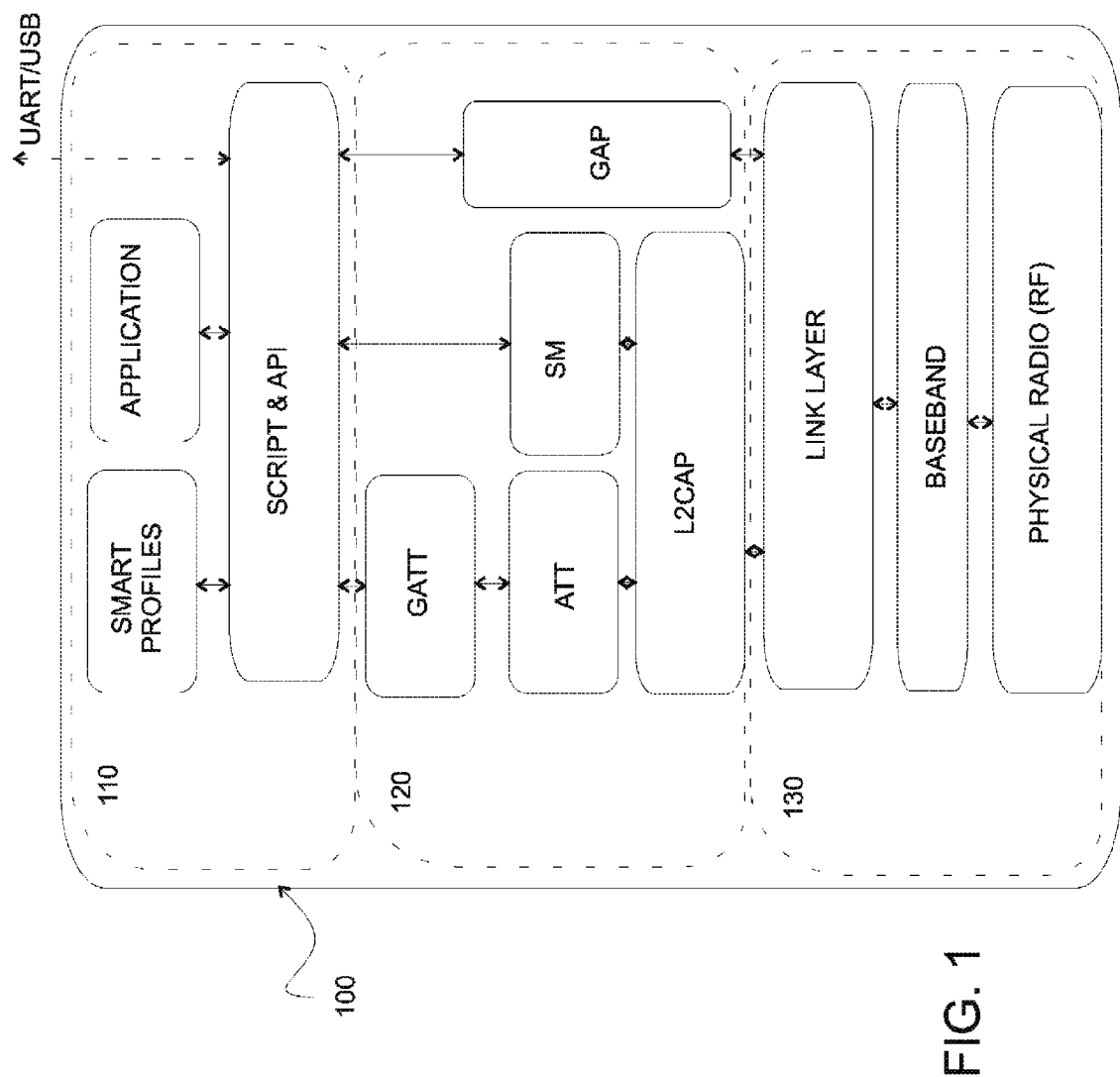
FIG. 1 shows a Bluetooth smart module according to an embodiment.

FIG. 1 illustrates an example of an electronic apparatus 100. According to an embodiment, the apparatus 100 is a Bluetooth smart module that comprises application layer 110, host layer 120 and a Bluetooth (or BLE) controller 120. The application layer 110 comprises the apparatus related application(s) (e.g. heart rate, proximity, blood pressure, time update, temperature, battery, . . . ), smart profiles, script and application programming interface (API). The application is capable of reading sensor data e.g. from heart rate sensor, and reporting the data to host layer for transmitting the data by means of the Bluetooth (or BLE) controller 130. The host layer 120 comprises protocols running over the connection. Host layer 120 also comprises data to be used in advertisement profile (GATT), generic access profile (GAP), attribute protocol (ATT), security manager (SM) and logical link control and adaptation protocol (L2CAP). The Bluetooth (or BLE) controller 130 comprises link layer, baseband and physical layer (i.e. physical radio, radio frequency RF).

The link layer provides ultra-low power idle mode operation and device discovery (i.e. connection mode and advertising mode handling). The link layer also is in charge for packet transmission and responding.

Figure 2:
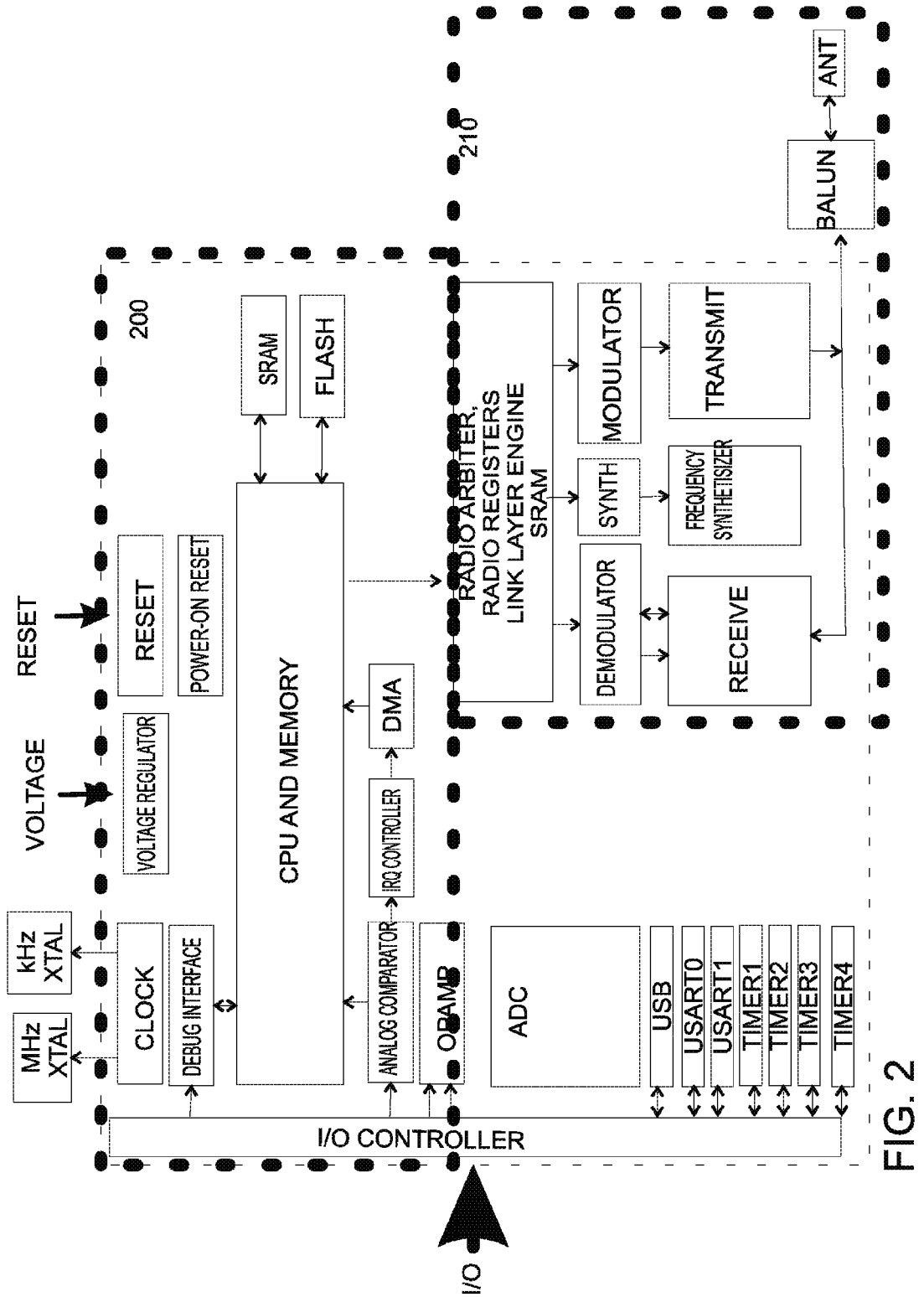
FIG. 2 shows a simplified block chart of a Bluetooth module.

FIG. 2 illustrates an example of a BLE module available on the market as a simplified block diagram. Central processing unit and memory means with application data are located in segment 200. A part of the link layer and physical layer are illustrated with reference 210. This segment 210 contains elements, such as radio registers, link layer engine, modulator-demodulator, receiving-transmitting means, frequency synthesizer, balancing-unbalancing unit (balun), antenna (ant).

In BLE technology one or more slave devices can be connected to a master device. The master is able to communicate with one or more slave devices, also simultaneously. To let the master know about the slave devices, the slave devices (or at that point "advertisers") periodically, at pseudo-random intervals, pass advertisement packets which a scanner device (i.e. "scanner") is scanning.

Advertisement packet types from the apparatus are

| | |
|---|---|
| ADV_IND | connectable undirected advertising event |
| ADV_DIRECT_IND | connectable directed advertising event |
| ADV_NONCONN-IND | non-connectable undirected advertising event |
| ADV_DISCOVER_IND | discoverable undirected advertising event |

Response packets from the scanning device to the advertisement packets of the advertising device are

| | |
|---|---|
| SCAN_REQ | scan request for further information from advertiser |
| CONNECT_REQ | connect request. |

When an advertising device receiver SCAN_REQ from a scanning device, the advertising device may give more information to the scanning device by SCAN_RSP packet. SCAN_RSP packet may contain information on the name of the advertising device and on the services the advertising device is able to provide. However, SCAN_RSP packet is not limited to carry only this information but may contain other data as well or instead.

CONNECT_REQ packet contains data on transmit window size defining timing window for first data packet, transmit window offset that is off when the transmit window starts, connection interval is the time between connection events, slave latency defines number of times the slave can ignore connection events from the master, connection timeout is maximum time between two correctly received packets in the connection before link is considered to be lost, hop sequence is a random number appointing the starting point for a hop, channel map, CRC initialization value.

When a scanner is connected to an advertiser, the advertiser is called "a slave" and the scanner is called "a master". The state for passing advertisement packets is called "advertising state" and the state for connection is called "connected state". In both states, data transfer occurs. Slave device may be a sensor or an actuator, such as a temperature sensor, heart rate sensor, light bulb, proximity sensor etc. Master device can be any electronic device e.g. mobile phone, smart phone, personal digital assistant, personal computer, laptop computer, tablet computer, etc. The electronic device may be capable of collecting data and/or capable of sending data to sensors. Additionally, the electronic device can be a rather low-end device in some occasions.

Packets sent from a slave device in advertising mode contains approximately 27 bytes of data and a slave address. Packets from master device in advertisement channel contains only a master address.

Figures 3A, 3B:
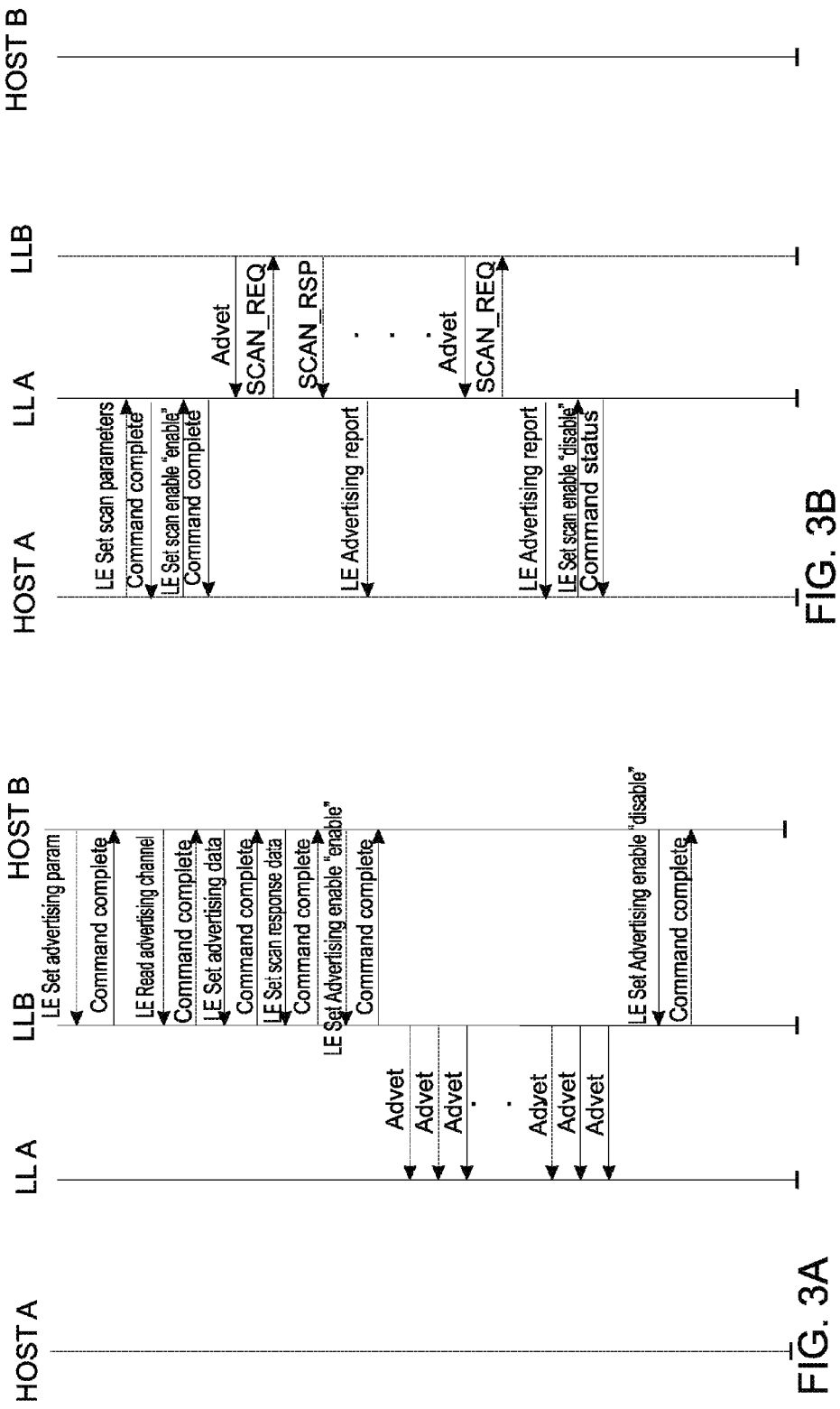
FIGS. 3*a*-3*b* shows an example of an advertising mode in a Bluetooth system.

FIGS. 3a-3b illustrate technical background for advertising modes. FIG. 3a illustrates a setup of device B to send advertisement packets. FIG. 3b illustrates a situation, where device B is sending packets and device A wishes to active scan. Host A and host B are a master device and a slave device respectively. LLA is link layer of the master device, i.e. host A, and LLB is link layer of the slave device, i.e. host B. From FIG. 3b it is realized that SCAN_REQ packet from host A as a response to an advertisement packet from link layer LLB of host B is transmitted to link layer LLB of host B. As a response to SCAN_REQ packet, the link layer LLB of the host B sends a SCAN_RESP packet with data.

Connection between the master device and the slave device can be formed by the master device sending CONNECT_REQ packet after the slave advertisement packet.

BLE devices are capable of determining RSSI (Received Signal Strength Indication) to measure a power of the received radio signal. The RSSI can be calculated from any packets in advertisement state or connected state The determined RSSI can also be used e.g. for approximating the distance between two devices. There are formulas to determine the distance by using RSSI, however, in some cases the RSSI is not valid, whereby the distance cannot be determined. For example, if the devices are too close then the receiver may saturate and no valid RSSI is obtained. On the other hand, if receiver sensitivity is lowered, the a signal with low power is not received. For example, Texas Instruments CC24540/1 (BLE) based devices have dynamic range of 63 dBm, and receiver saturates if signal value is higher than minimum dBm+63.

The present embodiments provide a solution by means of which a sensitivity of a device can be adjusted, whereby e.g. a valid RSSI can be obtained, and thus also more accurate distance between two devices can be determined. The present embodiments also may use sensitivity adjustment for other purposes also.

A first embodiment is illustrates with reference to FIG. 4 where the sensitivity of the radio is lowered in order to have a valid RSSI. In FIG. 4, a link layer 410 of a device 400 receives a first packet 425 from a device 450 by means of radio (RF) 420). The first packet may be received during connection event or advertisement interval. In the device 400, the radio 420 reports the received signal strength RSSI to the link layer 410, and determines whether the received signal strength is at maximum or close to the maximum, which is an indication of that the radio 420 has saturated. If the radio 420 of the device 400 has saturated, the device 400 lowers the sensitivity of the radio 420 for the following packets. The sensitivity adjustment affects the gain setting of the radio amplifier, which may be at first set to maximum amplification. For adjusting the sensitivity to lower sensitivity, a new gain setting of the radio amplifier should be selected to be enough to receive next packet, but not cause a saturation of the radio or not to lose the packets (with very low sensitivity, the packets may not be seen).

When a packet is received such that the radio has not saturated, RSSI is determined from it. This valid RSSI value is reported to the link-layer, which may send it further up to the application stack. Because of the sensitivity adjustment, the RSSI has compensated the received sensitivity—and the upper layers sees only valid RSSI values.

The valid RSSI values may be then used for determining the distance between device 400 and device 450 by using the known distance determination algorithms. The solution disclosed here improves the accuracy of the distance measurement. Due to this, new applications utilizing distance measurement can be developed. One example of a new application is a lock configured to be opened with a mobile device. In such an example, the lock must not open if the mobile device is close to the door, but only when the mobile device is almost touching the lock. Today, the receiver saturates when the transmitter is half meters away, and no accurate distance determination can be made. Therefore, such an application cannot be implemented with the technology prior the application.

The valid RSSI value can be used for approximating the distance. Based on that, the different triggers may take place. The advantage of the solution is that the low sensitivity does not unnecessarily wake up the upper layer of the Bluetooth module. This means that the Bluetooth module scanning may not "see" the whole device until the other device is close to enough. Or vice versa, the advertiser device does not see the SCAN_REQ until the scanner device is close enough. This has a power consumption benefit in addition to the accuracy and usability benefit.

Figure 5:
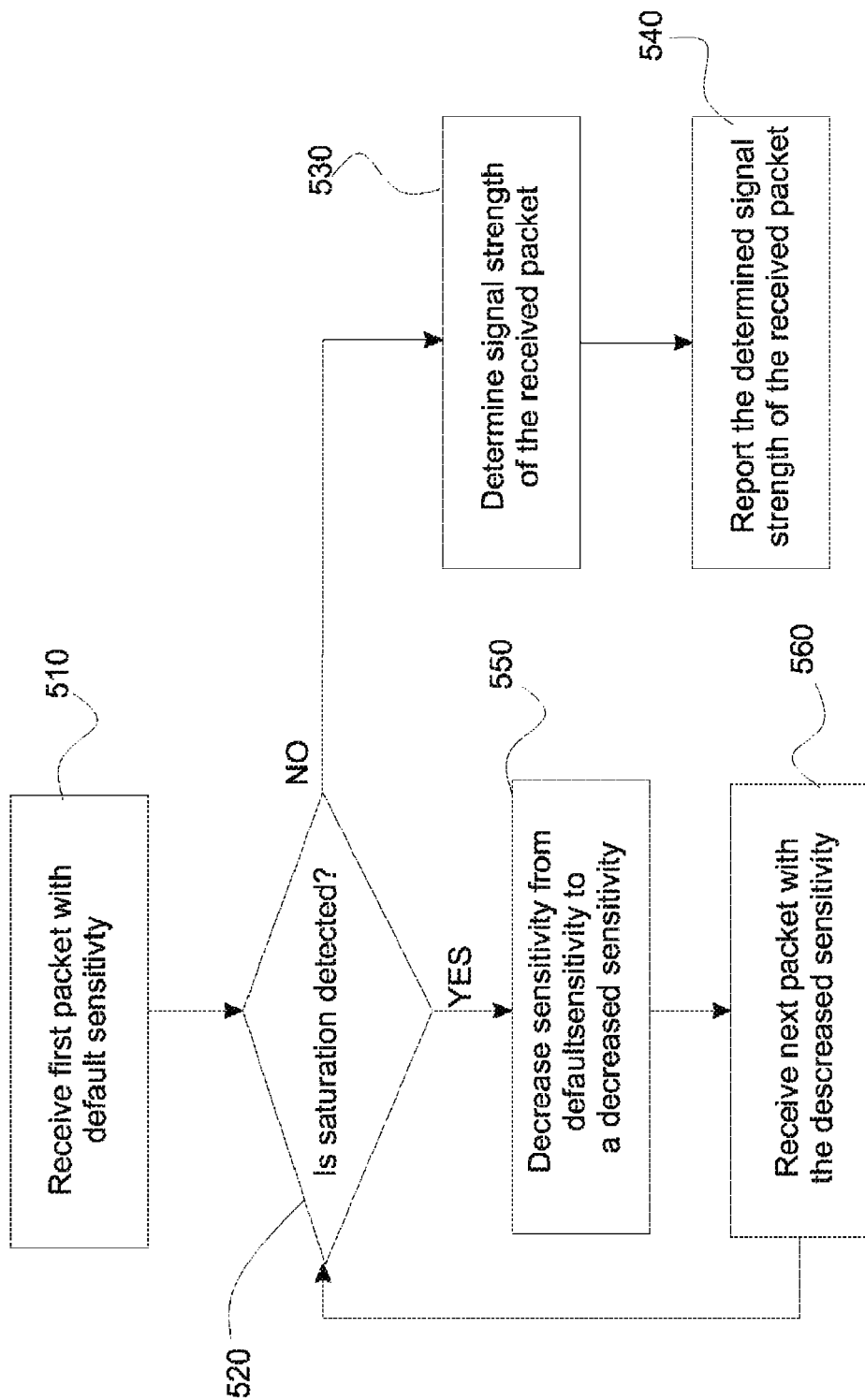
FIG. 5 shows a method according to an embodiment.

FIG. 5 illustrates a method according to the previous example as a flowchart. In this embodiment, the method comprises receiving first packet with default sensitivity 510;
detecting whether saturation occurs 520;
if so, decreasing sensitivity from default sensitivity to a decreased sensitivity 550, and receiving next packet with the decreased sensitivity 560. The method continues from the saturation detection step 520;
if saturation has not occurred, signal strength of the received packet is determined 530, and the determined signal strength of the received packet is reported 540.

Figure 6:
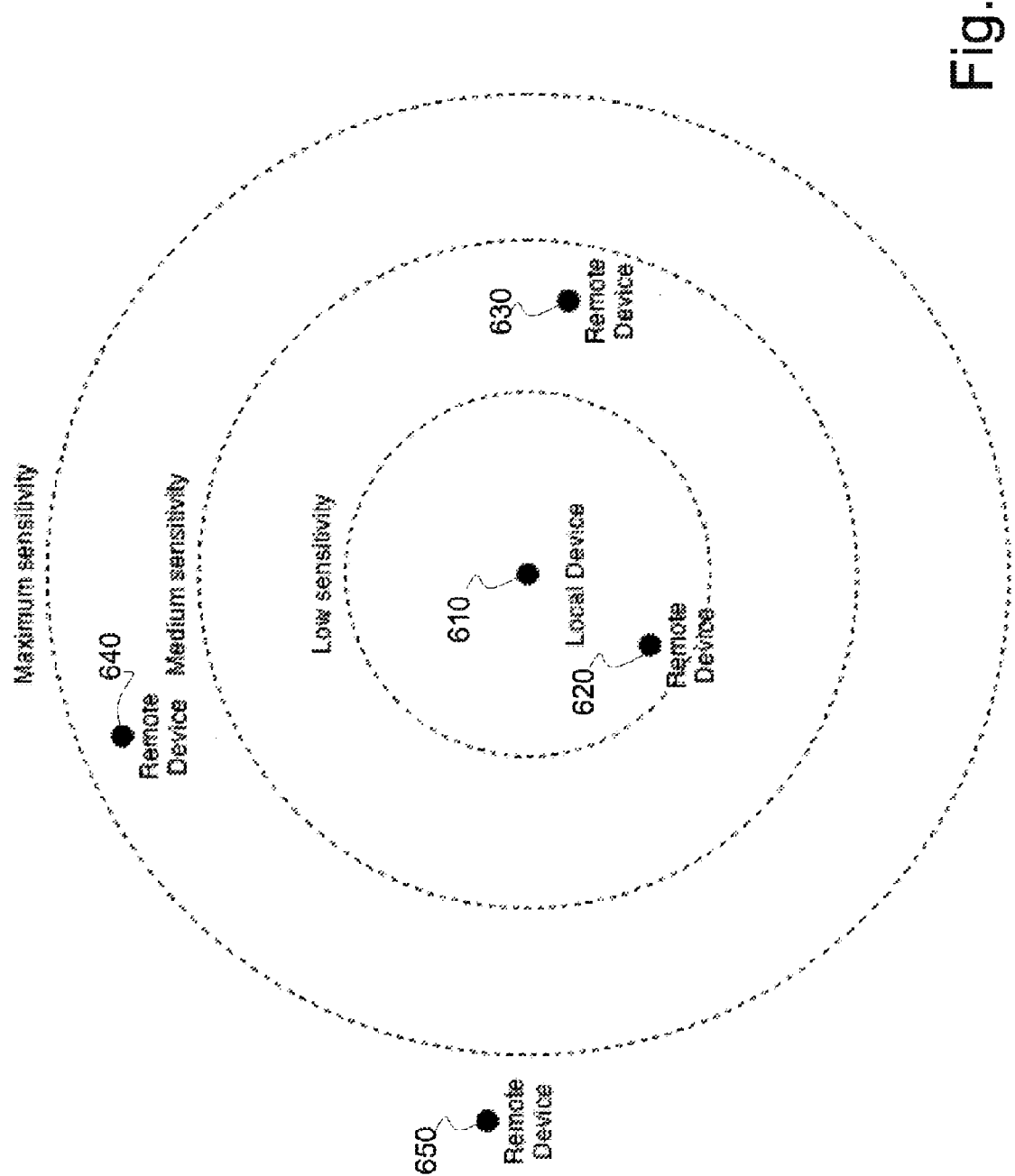
FIG. 6 shows an example of a local device with various sensitivity levels.

FIG. 6 illustrates an example of a use case. There is a local device 610 in the center. Also remote devices 620, 630, 640, 650 are illustrated in the figure. FIG. 6 illustrates with which level of sensitivity the local device 610 is able receive packets from the remote devices without saturation in the radio. For example, in order to receive packets from remote device 620 from which RSSI can be determined, the local device 610 needs to have a low sensitivity. Further, in order to receive packets from remote device 630 from which RSSI can be determined, the local device 610 needs to receive packets from remote device 630 with medium sensitivity. However, if the sensitivity is low, the local device may not see the remote device 630 at all. Yet, further packets from remote device 640 for determining RSSI are received with maximum sensitivity. Remote device 650, on the other hand, is out of range.

Figure 7:
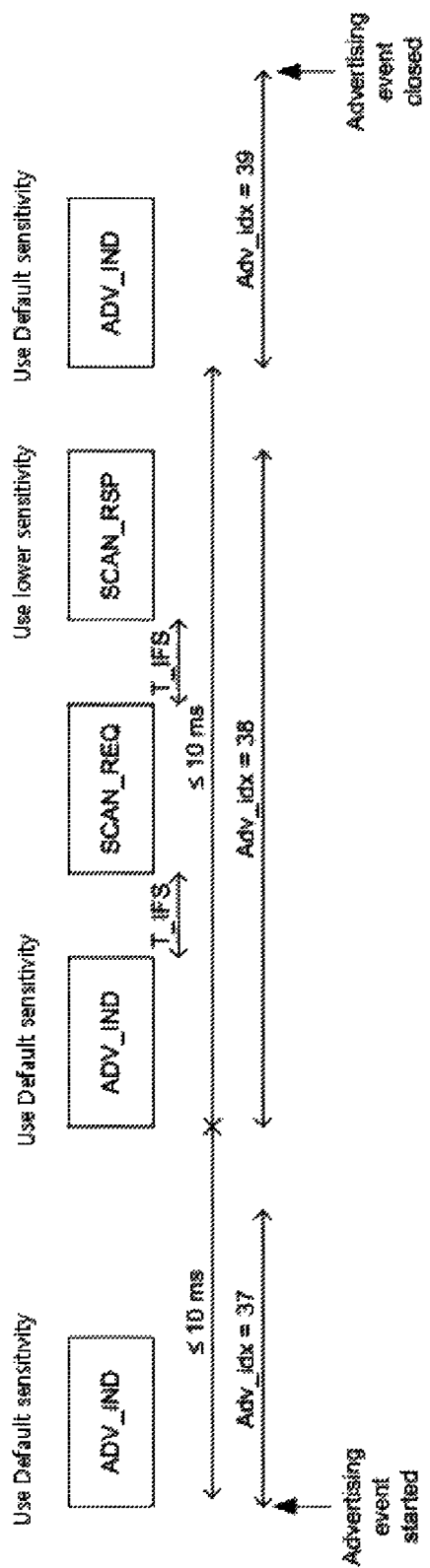
FIG. 7 shows an example of scanner device's operation during advertisement.
Figure 8:
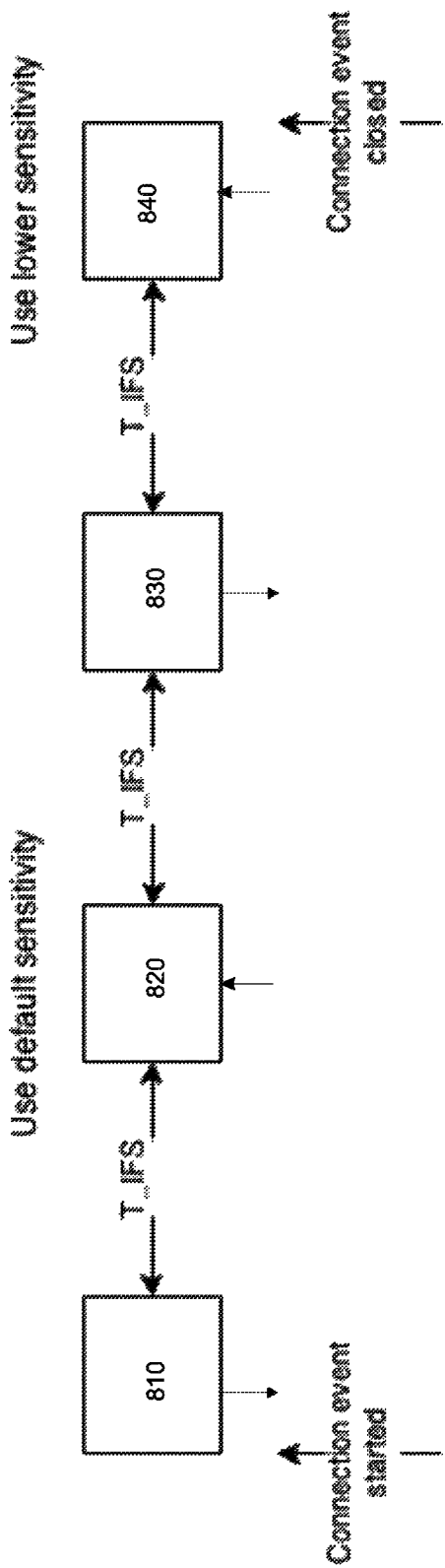
FIG. 8 shows an example of master device's operation during connection event.

FIGS. 7-9 illustrates scanner's operation, master's operation and slave's operation when utilizing the present embodiment. It is to be noted, that the embodiments of the present invention occurs either during connection event or advertisement event. The connection interval or advertisement interval defines how often the events occur. In addition, the examples discloses embodiments where the sensitivity is lowered after getting the packets. However, it is appreciated that the lowering may happen prior any packet has been transmitted/received.

In these examples
T_IFS=150ρs and
Adv_idx=Advertisement channel used:
37=2402 MHz
38=2426 MHz
39=2480 MHz FIG. 7 illustrates an embodiment of scanner operation during advertisement. ADV_IND are advertisement packets sent by an advertising device. When the advertising event begins, the scanner uses default sensitivity for scanning the advertising packets. When receiving the advertising packet, the scanning device detects saturation in the radio. The scanner sends a SCAN_REQ packet to the advertising device and adjust the gain setting of the radio. Thus SCAN_RSP packet from the advertising device is received with lower sensitivity. This SCAN_RSP packet is used for determining RSSI, and further the distance to the advertising device. Further advertising packets are again received with default sensitivity.

FIG. 8 illustrates an embodiment of a master operation during connection event. When connection event has started, the master sends a packet 810 to a slave. Default sensitivity is used for receiving a packet 820 from a slave. However, this may cause saturation in the radio, whereby no valid RSSI can be determined. Therefore, for receiving the response packet 840 to the next packet 830 the master had send to the slave, the master lowers the sensitivity. The packet 840 can be used for determining the RSSI and further the distance between the master device and the slave device. If there is no more data to transmit, the connection event is closed. Otherwise the connection event may continue and packets are continuously received with the lower sensitivity.

FIG. 9 illustrates an embodiment of a slave operation during connection event. When the connection event has started, the slave receives a packet 910 from the master with default sensitivity. This may cause saturation in the radio, whereby no valid RSSI can be determined. The slave transmits a packet 920 to the master and lowers the sensitivity. The next packet 930 that is received from the master is received thus with lower sensitivity, and RSSI can be determined from that packet 930. The slave responds to the packet 930 with packet 940. If there is no more data to transmit, the connection event is closed. Otherwise the connection event may continue and packets are continuously received with the lower sensitivity.

A second embodiment is disclosed with reference to FIG. 6. This example relates to sensitivity adjustment of a radio for other purposes than RSSI measurement. The need for sensitivity adjustment (e.g. decrease) may be based on the current use or prior use (i.e. signal strength of at least one existing connection, or at least one previous connection), where it has been detected that there are too many devices 630, 640, 650 in sight of the local device 610. This means that the radio sensitivity is too high. The local device 610 may lower the sensitivity so that the devices 630, 640, 650 are filtered out from the range, and only device's 620 data transmission is detected. By this the sensitivity adjustment is for limiting traffic.

The various embodiments may provide advantages. For example, the present embodiments provide higher accuracy BLE solution for distance measurement in both far and short distances at the same time. The adjustment of sensitivity improves accuracy in RSSI distance measurement. Further, due to the sensitivity adjustment, the data transmission of certain devices may easily be filtered out.

The various embodiments of the invention can be implemented with the help of computer program code that resides in a memory and causes the relevant apparatuses to carry out the invention.

It is obvious that the present invention is not limited solely to the above-presented embodiments, but it can be modified within the scope of the appended claims.

The invention claimed is:

1. A method, comprising:
   a) receiving a first packet from a Bluetooth low energy (BLE) enabled sender with a default sensitivity by a radio and link layer of a BLE enabled receiver, the link layer being coupled between the radio and an application layer of the receiver;
   b) determining if a saturation occurs in the receiver due to the received packet, and if so:
      decreasing the sensitivity from the default sensitivity to a lower sensitivity,
      receiving at least one second packet in the radio and link layer of the receiver with the lower sensitivity, and going to step b);
   c) otherwise determining signal strength of the received packet; and
   d) reporting the signal strength to the link layer of the receiver.

2. The method according to claim 1, wherein the method further comprises performing step d) to report the signal strength of the received packet from the radio to the application layer through the link layer of the receiver; and further comprises:
   e) using the application layer of the receiver to determine a distance between the receiver and the sender using the reported determined signal strength.

3. The method of claim 2, further comprising only performing steps d) and e) if no saturation is found to occur in step b).

4. The method of claim 3, where step d) further comprises using the link layer of the receiver to report the signal strength to the application layer of the receiver only if no saturation is determined to occur in step b); and where the method further comprises only performing step e) to determine the distance between the receiver and the sender if the signal strength is reported to the application layer in step d).

5. The method of claim 4, further comprising receiving only packets by the receiver which are now available with the lower sensitivity and not waking up the application layer of the receiver until at least one second packet is received at the lower sensitivity in step b) and step d) is performed.

6. The method according to claim 1, further comprising:
   first exchanging packets between the sender and the receiver to establish at least one BLE connection between the sender and the receiver;
   then performing step b) to dynamically adjust the sensitivity from the default sensitivity to the lower sensitivity based on the signal strength of the at least one connection; and
   then receiving only packets by the receiver which are available with the lower sensitivity, not waking up the application layer of the receiver unless at least one packet is received with the lower sensitivity.

7. The method of claim 6, where the step of first exchanging packets between the sender and the receiver comprises first exchanging BLE advertisement and connection request packets between the sender and the receiver to establish at least one BLE connection between the sender and the receiver.

8. The method of claim 1, further comprising first setting the default sensitivity of the receiver in step a) by selecting a gain setting of a radio amplifier of the receiver to be maximum amplification; and then iteratively performing step b) to select a new lower gain setting of the radio amplifier to allow reception of packets without causing saturation in the receiver and without losing packets.

9. The method of claim 1, where step b) further comprises transmitting a packet from the receiver to the sender after decreasing the sensitivity and before receiving the at least one second packet with the adjusted sensitivity.

10. The method of claim 1, where step b) comprises performing the following steps before performing steps c)-e):
    first determining that saturation occurs in the receiver due to the received packet, and decreasing the sensitivity from the default sensitivity to a first lower sensitivity;
    then receiving a second packet in the radio and link layer of the receiver with the first lower sensitivity;
    then determining that saturation occurs in the receiver due to the received second packet, and decreasing the sensitivity from the first lower sensitivity to a second lower sensitivity;
    then receiving a third packet in the radio and link layer with the second lower sensitivity; and
    then determining if a saturation occurs in the receiver due to the received third packet.

11. A Bluetooth low energy (BLE) enabled apparatus comprising a link layer being coupled between a radio and an application layer, the apparatus being configured to:
    a) receive a first packet from a Bluetooth low energy (BLE) enabled sender with a default sensitivity by a radio and link layer of the apparatus;
    b) determine if a saturation occurs in the apparatus due to the received packet, and if so:
       decrease the sensitivity from the default sensitivity to a lower sensitivity,
       receive at least one second packet in the radio and link layer with the lower sensitivity, and going to step b);
    c) otherwise determine signal strength of the received packet; and
    d) report the determined signal strength to the link layer.

12. The apparatus according to claim 11, wherein the apparatus is further configured to perform step d) to report the signal strength of the received packet from the radio to the application layer through the link layer of the apparatus; and to e) determine a distance between the apparatus and the sender using the determined signal strength.

13. The apparatus of claim 12, where the apparatus is further configured to perform steps d) and e) if no saturation is found to occur in step b).

14. The apparatus of claim 13, where the apparatus is further configured to use the link layer of the apparatus to perform step d) to report the signal strength to the application layer of the apparatus only if no saturation is determined to occur in step b); and then to only perform step e) to determine the distance between the apparatus and the sender if the signal strength is reported to the application layer in step d).

15. The apparatus of claim 14, where the apparatus is further configured to only receive packets by the apparatus which are now available with the lower sensitivity and to not wake up the application layer of the apparatus until at least one second packet is received at the lower sensitivity in step b) and step d) is performed.

16. The apparatus according to claim 11, wherein the apparatus is further configured to:
    first exchange packets with the sender to establish at least one BLE connection between the sender and the apparatus;
    then perform step b) to dynamically adjust the sensitivity from the default sensitivity to the lower sensitivity based on the signal strength of the at least one connection; and then receive only packets which are available with the lower sensitivity, and not wake up the application layer of the apparatus unless at least one packet is received with the lower sensitivity.

17. The apparatus of claim 16, where the apparatus is configured to first exchange packets with the sender to establish at least one BLE connection between the sender and the apparatus by exchanging BLE advertisement and connection request packets between the sender and the receiver to establish at least one BLE connection between the sender and the receiver.

18. The apparatus of claim 11, where the apparatus is further configured to first set the default sensitivity of the apparatus in step a) by selecting a gain setting of a radio amplifier of the apparatus to be maximum amplification; and then iteratively perform step b) to select a new lower gain setting of the radio amplifier to allow reception of packets without causing saturation in the apparatus and without losing packets.

19. The apparatus of claim 11, where the apparatus is further configured to perform step b) by transmitting a packet from the apparatus to the sender after decreasing the sensitivity and before receiving the at least one second packet with the adjusted sensitivity.

20. The apparatus of claim 11, where the apparatus is further configured to perform step b) by performing the following steps before performing steps c)-e):

first determining that saturation occurs in the apparatus due to the received packet, and decreasing the sensitivity from the default sensitivity to a first lower sensitivity;

then receiving a second packet in the radio and link layer of the apparatus with the first lower sensitivity;

then determining that saturation occurs in the apparatus due to the received second packet, and decreasing the sensitivity from the first lower sensitivity to a second lower sensitivity;

then receiving a third packet in the radio and link layer with the second lower sensitivity; and then determining if a saturation occurs in the apparatus due to the received third packet.

21. A computer program product embodied on a non-transitory computer readable medium comprising computer program code configured to, when executed on at least one processor, cause an apparatus or a system comprising a link layer being coupled between a radio and an application layer to:

a) receive a first packet from a Bluetooth low energy (BLE) enabled sender with a default sensitivity by a radio and link layer of the apparatus;

determine if a saturation occurs in the receiver due to the received packet, and if so:

decrease the sensitivity from the default sensitivity to a lower sensitivity, receive at least one second packet in the radio and link layer with the lower sensitivity, and going to step b);

b) otherwise determine signal strength of the received packet; and c) report the determined signal strength to the link layer.

* * * * *